(12) United States Patent
Kim et al.

(10) Patent No.: US 12,225,292 B2
(45) Date of Patent: Feb. 11, 2025

(54) ELECTRONIC DEVICE COMPRISING UWB ANTENNAS AND METHOD FOR IMPLEMENTING 6DoF

(71) Applicant: Samsung Electronics Co., Ltd., Suwon-si (KR)

(72) Inventors: Chulkwi Kim, Suwon-si (KR); Geonho Yoon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 483 days.

(21) Appl. No.: 17/501,459

(22) Filed: Oct. 14, 2021

(65) Prior Publication Data
US 2022/0116542 A1    Apr. 14, 2022

Related U.S. Application Data

(63) Continuation of application No. PCT/KR2021/013857, filed on Oct. 8, 2021.

(30) Foreign Application Priority Data

Oct. 12, 2020    (KR) ........................ 10-2020-0131469

(51) Int. Cl.
*H04N 23/695* (2023.01)
*H01Q 5/25* (2015.01)

(52) U.S. Cl.
CPC ............. *H04N 23/695* (2023.01); *H01Q 5/25* (2015.01)

(58) Field of Classification Search
CPC .......... H04N 23/695; H04N 5/14; H04N 7/18; H04N 5/144; H04N 7/181; H01Q 5/25;
(Continued)

(56) References Cited

U.S. PATENT DOCUMENTS

2008/0095402 A1    4/2008    Kochi et al.
2009/0022369 A1    1/2009    Satoh et al.
(Continued)

FOREIGN PATENT DOCUMENTS

CN        109587188 A        4/2019
CN        109839944 A        6/2019
(Continued)

OTHER PUBLICATIONS

Search Report and Written Opinion issued Jan. 12, 2022 in counterpart International Patent Application No. PCT/KR2021/013857.
(Continued)

*Primary Examiner* — Vladimir Magloire
*Assistant Examiner* — Remash R Guyah
(74) *Attorney, Agent, or Firm* — NIXON & VANDERHYE P.C.

(57) ABSTRACT

An electronic device according to an embodiment includes: an ultra-wide band (UWB) communication module including a plurality of antennas, and a processor operatively connected to the UWB communication module, wherein the processor is configured to: measure a first coordinate of a first external device and a second coordinate of a second external device generated based on signals received from the first external device and the second external device using the plurality of antennas, generate a first coordinate system based on the electronic device corresponding to the measured first coordinate and second coordinate, and regenerate a second coordinate system through reconfiguration of the first coordinate system based on the first external device.

20 Claims, 11 Drawing Sheets

(58) Field of Classification Search
CPC ...... H01Q 1/273; H01Q 21/28; G01S 5/0205; G01S 5/0284; G01S 5/16; G02B 27/01; G02B 27/017; G06F 3/011; G06F 3/012; G06F 3/0304; G06F 3/0346
USPC .................................................. 342/445, 444
See application file for complete search history.

(56) References Cited

U.S. PATENT DOCUMENTS

| | | | |
|---|---|---|---|
| 2015/0070274 | A1 | 3/2015 | Morozov |
| 2018/0093177 | A1 | 4/2018 | Tokubo |
| 2018/0217663 | A1* | 8/2018 | Chandrasekhar ..... G06F 3/0346 |
| 2018/0277937 | A1 | 9/2018 | Yang et al. |
| 2019/0387359 | A1 | 12/2019 | Kean et al. |
| 2020/0026362 | A1 | 1/2020 | Kim et al. |
| 2020/0304758 | A1* | 9/2020 | Valli ...................... H04N 7/157 |
| 2020/0304942 | A1 | 9/2020 | Pollefeys |
| 2020/0348767 | A1 | 11/2020 | Araujo et al. |

FOREIGN PATENT DOCUMENTS

| | | |
|---|---|---|
| EP | 1 852 821 B1 | 4/2008 |
| EP | 1 906 140 B2 | 3/2019 |
| KR | 10-1407325 | 6/2014 |
| KR | 10-2014-0133036 | 11/2014 |
| KR | 10-1902715 | 9/2018 |
| KR | 10-2019-0106939 | 9/2019 |
| WO | 2019/161903 | 8/2019 |

OTHER PUBLICATIONS

Extended European Search Report dated Feb. 16, 2024 for EP Application No. 21880416.9.
Office Action for KR Application No. 10-2020-0131469 mailed Oct. 2, 2024 and English translation, 9 pages.

* cited by examiner

ELECTRONIC DEVICE COMPRISING UWB ANTENNAS AND METHOD FOR IMPLEMENTING 6DoF

CROSS-REFERENCE TO RELATED APPLICATIONS

This application is a continuation of International Application No. PCT/KR2021/013857 designating the United States filed on Oct. 8, 2021, in the Korean Intellectual Property Receiving Office and claiming priority to Korean Patent Application No. 10-2020-0131469, filed on Oct. 12, 2020, in the Korean Intellectual Property Office, the disclosures of which are incorporated by reference herein in their entireties.

BACKGROUND

Field

The disclosure relates to an electronic device comprising UWB antennas and a method for implementing 6 degrees of freedom.

Description of Related Art

Augmented reality (AR) may refer to a technology that makes a virtual object appear to exist in a real space through combination of the real space and a virtual space. The augmented reality may be originated from virtual reality (VR) that generates the virtual space similar to the reality using computer graphics.

Recently, wearable electronic devices that can be directly worn on the human body have been developed. For example, the wearable electronic devices, such as a head-mounted device (HMD), head-mounted display (HMD), smart watch, smart wristband, and the like, may be formed to be detachable from a part of the body or clothes.

Through an experience of virtual spaces, being called AR and VR, various kinds of content have been developed to keep pace with the increase of consumers. In particular, as the number of antennas built in an electronic device such as a smartphone (hereinafter, "electronic device") is increased, expectations for utilization of the content capable of grasping the location in a space are growing.

A device for providing an experience of a virtual space may include an HMD device and a controller device. A user, who moves in a state of wearing the HMD device and holding the controller device in hand, can be provided with a virtual screen that is changed depending on the movement direction of the user and the movement of the HMD device.

If the controller device moves together with the movement of the user to track the trajectory, a plurality of cameras or sensors provided on the HMD device may be utilized. The cameras or the sensors have photographing ranges (e.g., angles of view) or sensing ranges, and if the controller device gets out of the photographing ranges or the sensing ranges, the tracking of the controller device may not be performed normally. Further, the trajectory tracking of the controller device through the cameras or the sensors of the HMD device may be stopped depending on the change of surrounding environments. The tracking using the cameras may have a low recognition rate due to a dark environment, outdoor IR interference, and the like. The tracking using the sensors may cause the tracking of the controller device not to be normally performed due to a bright indoor environment or an environment in transportation (e.g., automobile, airplane, and the like).

SUMMARY

An electronic device according to example embodiments disclosed in the disclosure may include: an ultra-wide band (UWB) communication module including a plurality of antennas; and a processor operatively connected to the UWB communication module, wherein the processor is configured to: measure a first coordinate of a first external device and a second coordinate of a second external device generated based on signals received from the first external device and the second external device using the plurality of antennas, generate a first coordinate system based on the electronic device corresponding to the measured first coordinate and second coordinate, and regenerate a second coordinate system through reconfiguration of the first coordinate system based on the first external device.

A method for tracking movement of an external device using a plurality of antennas according to example embodiments disclosed in the disclosure may include: measuring a first coordinate of a first external device and a second coordinate of a second external device generated based on signals received from the first external device and the second external device using the plurality of antennas; generating a first coordinate system based on the electronic device corresponding to the measured first coordinate and second coordinate; and regenerating a second coordinate system through reconfiguration of the first coordinate system based on the first external device.

According to various example embodiments of the disclosure, the locations of the HMD device and the controller can be identified using the plurality of antennas which may be provided in the UWB communication module of the electronic device. The coordinate system generated based on the electronic device may be changed and regenerated based on the HMD device.

Further, since the trajectory of the controller device is tracked by transmitting and receiving the signals to and from the external device (e.g., HMD device or controller device) using the plurality of antennas provided on the electronic device, the trajectory tracking may be less affected by the change of the external environment. In an open environment in which the virtual space can be provided, interference occurs rarely with respect to the signals being transmitted and received from the antennas, and thus there may be less or no problems even if the controller device gets out of the ranges of the cameras or the sensors.

According to various example embodiments of the disclosure, in tracking the trajectory of the controller in the system using the antennas of the electronic device, a limit range may not exist with respect to the 6 degrees of freedom (6DoF).

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
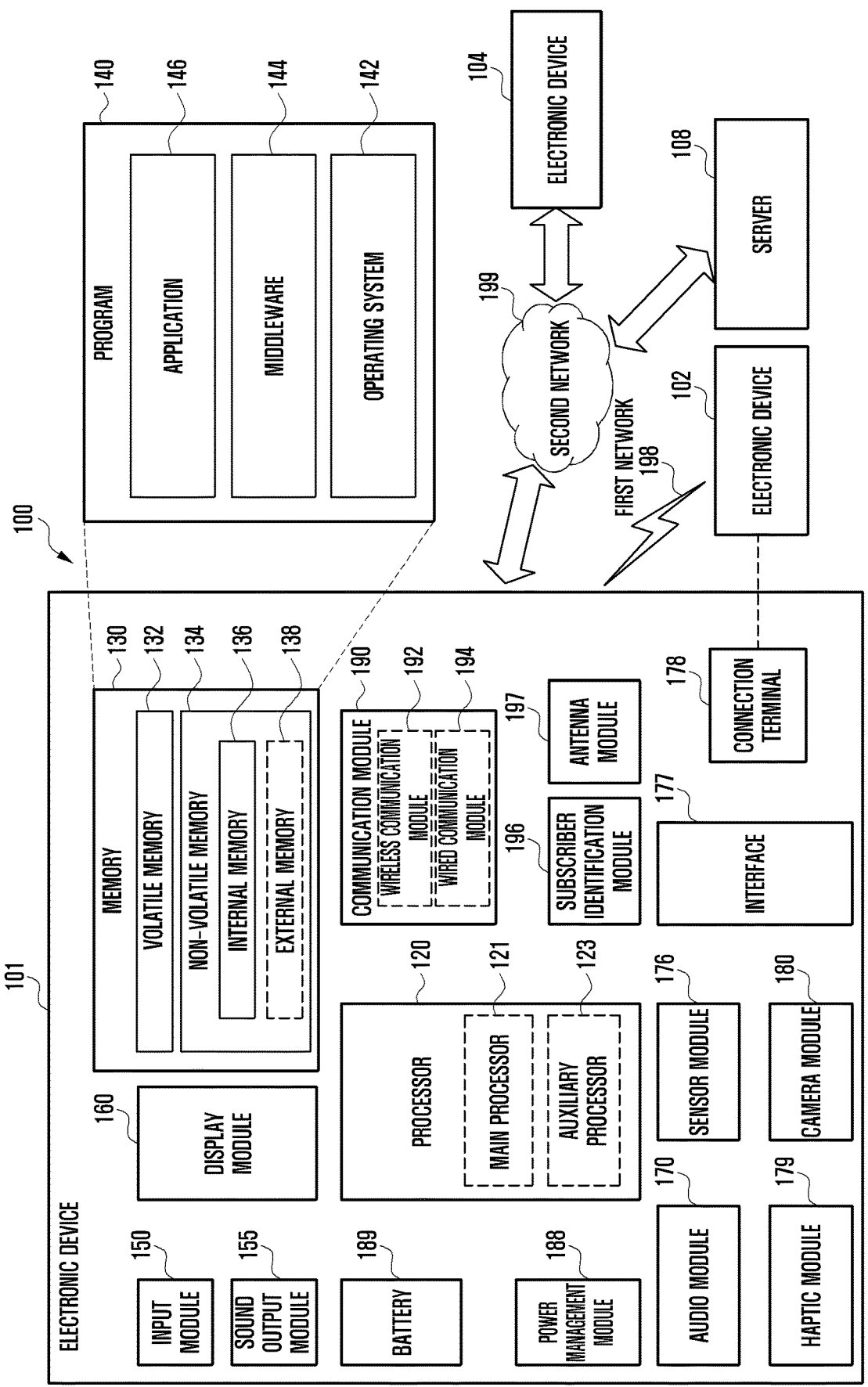
FIG. 1 is a block diagram of illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
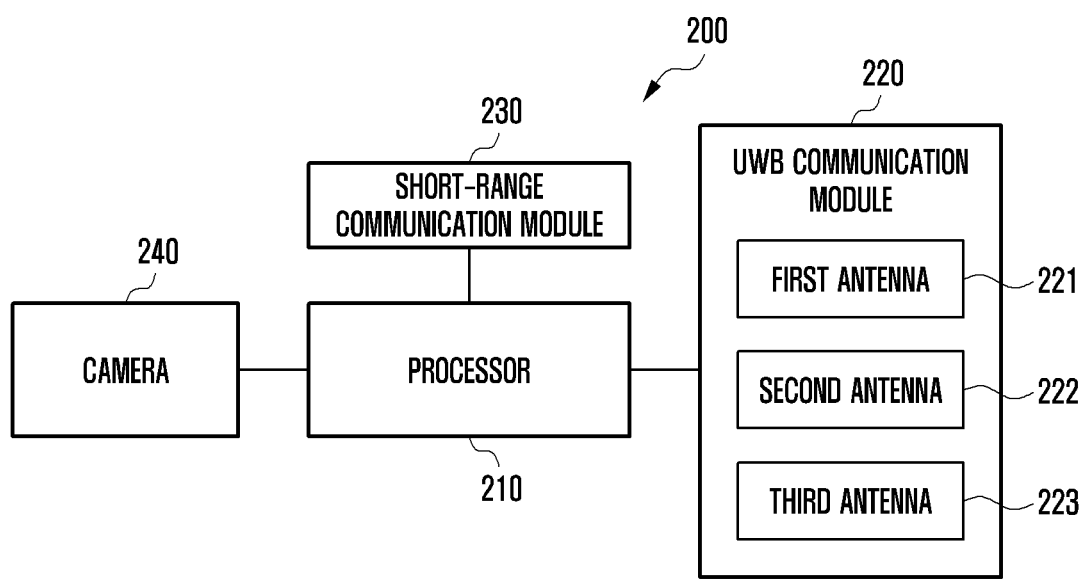
FIG. 2 is a block diagram illustrating an example configuration of an electronic device according to various embodiments.

FIG. 2 is a block diagram illustrating an example configuration of an electronic device according to various embodiments.

Referring to FIG. 2, an electronic device 200 (e.g., electronic device 101 of FIG. 1) may include a processor (e.g., including processing circuitry) 210 (e.g., processor 120 of FIG. 1), a UWB communication module (e.g., including at least one antenna) 220 (e.g., communication module 190 of FIG. 1), a short-range communication module (e.g., including communication circuitry) 230 (e.g., communication module 190 of FIG. 1), and a camera 240 (e.g., camera module 180 of FIG. 1), and some of the illustrated embodiments may be omitted or replaced. The electronic device may include at least a part of the embodiment and/or function of the electronic device 101 of FIG. 1.

According to various embodiments, the processor 210 may include various processing circuitry and be configured to be able to perform calculation or data processing for the control and/or communication of respective elements of the electronic device 200, and may include at least a part of the configuration and/or function of the processor 120 of FIG. 1. The processor may be functionally, operatively, and/or electrically connected to the internal elements of the electronic device including the UWB communication module, the short-range communication module, and the camera.

According to various embodiments, the UWB communication module 220 may include various circuitry and/or at least one antenna and can perform communication with a wide bandwidth using UWB antennas (e.g., first antenna 221, second antenna 222, and third antenna 223) (e.g., antenna module 197 of FIG. 1). For example, the UWB antenna can perform communication utilizing a frequency bandwidth that is equal to or higher than 3.1 GHz and lower than 10.6 GHz. The UWB can perform communication according to the standard specification of IEEE 802.15.3. According to an embodiment, the UWB communication module may perform communication for the purpose of data transmission and reception, and may enter a sleep state or a standby state while the data transmission and reception through a short-range communication module is performed. In this case, through reduction of a power being consumed by the UWB communication module, the power efficiency of the electronic device can be increased. The UWB communication module according to various embodiments of the disclosure may include at least a part of the configuration and/or function of the communication module 190 of FIG. 1.

According to various embodiments, the UWB communication module 220 may be connected to the plurality of antennas (e.g., first antenna 221, second antenna 222, and third antenna 223). The UWB communication module may transmit data using at least a part of the first antenna to the third antenna. The UWB communication module may receive data using at least a part of the first antenna to the third antenna. According to an embodiment, the antenna being used to transmit the data may be the same as the antenna being used to receive the data. According to an embodiment, the antenna being used to transmit the data may be different from the antenna being used to receive the data.

According to various embodiments, the short-range communication module 230 may include various communication circuitry and perform communication with an external device located in a short distance. For example, if the electronic device and the external device are located in a distance enough to be connected to each other so as to perform short-range communication, they can be connected to communicate with each other through the short-range communication module. According to an embodiment, the short-range communication module 230 may support the communication connection utilizing methods, such as Bluetooth, Bluetooth low energy, and ZigBee. Such communication connection methods are merely examples, and the embodiment is not limited thereto. The communication module according to various embodiments of the disclosure may include at least a part of the configuration and/or function of the communication module 190 of FIG. 1.

According to various embodiments, one or more cameras 240 may be provided. For example, a plurality of cameras including an optical camera may be provided. In case of the optical camera, it may detect the brightness of an optical element (e.g., LED element) of the external device. According to an embodiment, the camera may be configured to perform an image tracking for forming a coordinate system of the external device. For example, if the external device is not in a fixed location, but moves being accompanied by motion, the camera may track the motion while photographing the external device as an image. The camera according to various embodiments of the disclosure may include at least a part of the configuration and/or function of the camera module 180 of FIG. 1.

Figure 3A:
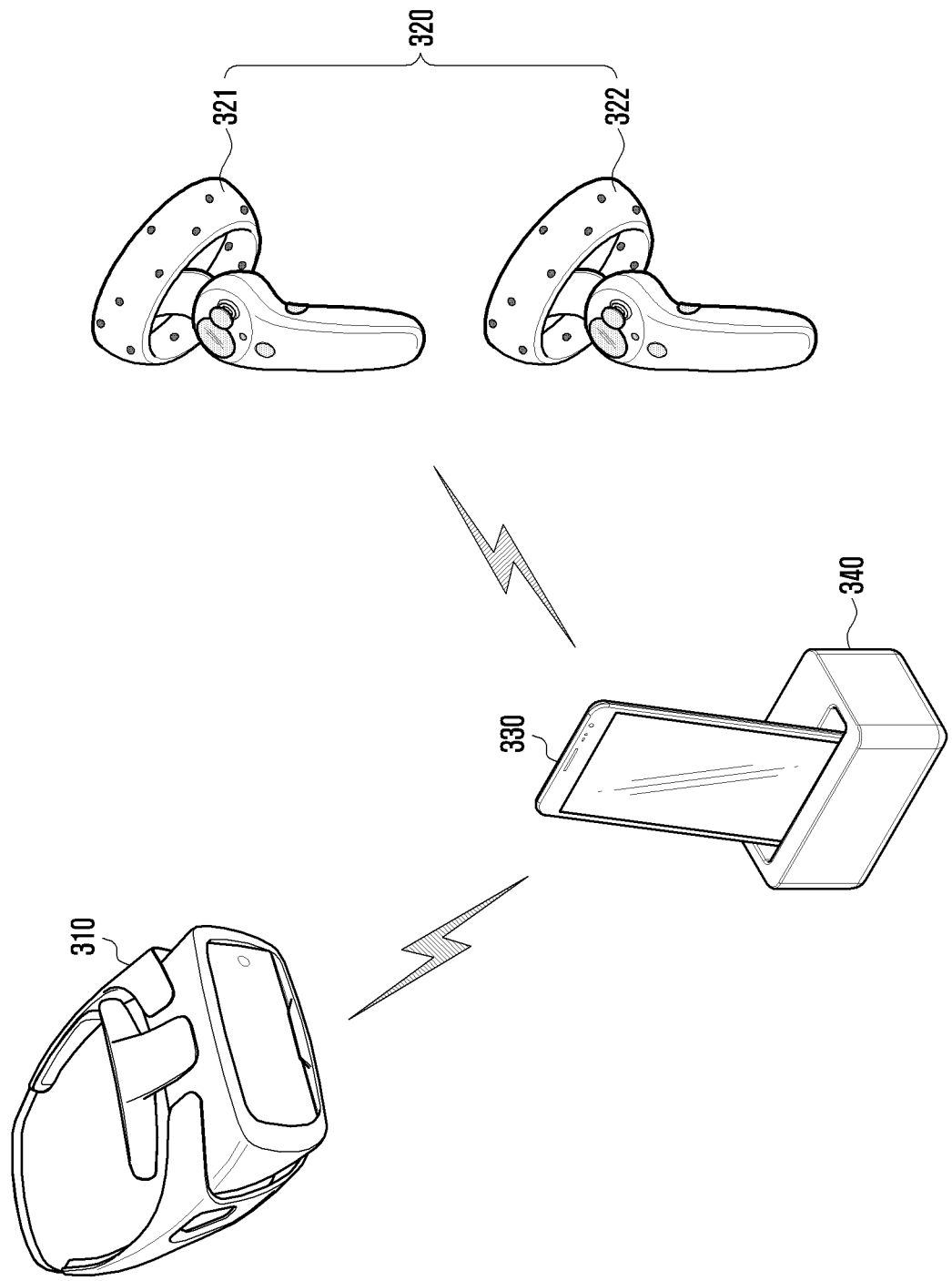
FIGS. 3A and 3B are diagrams illustrating example communication connections between an electronic device and an external device according to various embodiments.
Figure 3B:
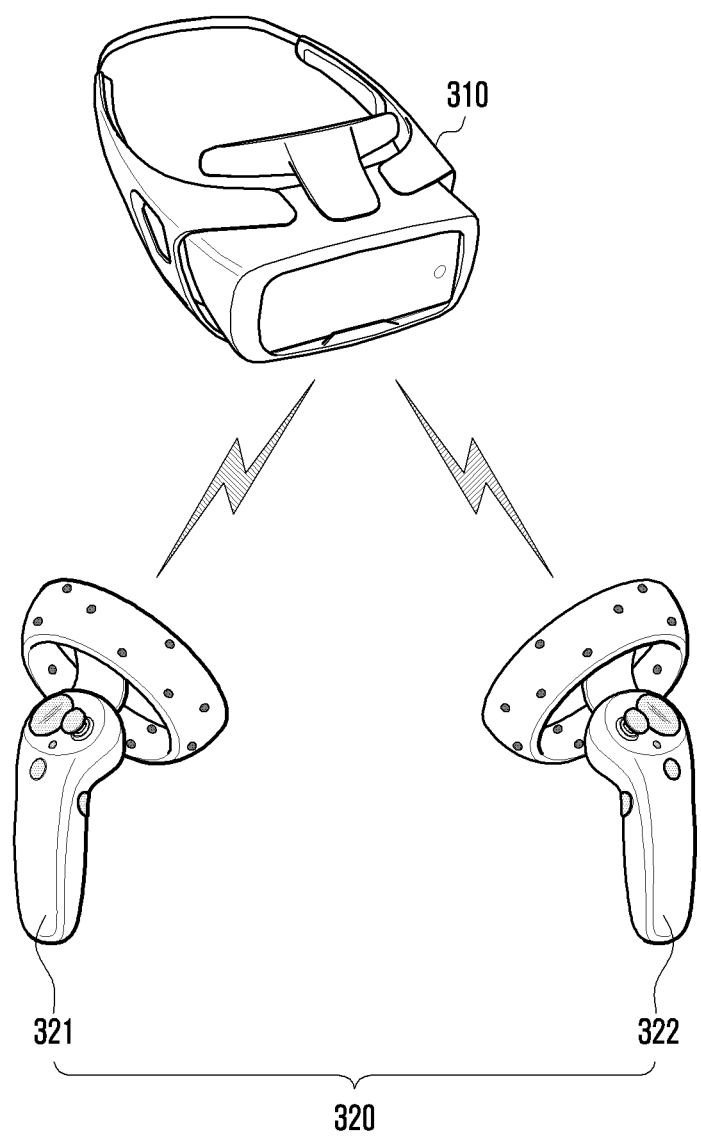

FIGS. 3A and 3B are diagrams illustrating example communication connections between an electronic device and an external device according to various embodiments.

Referring to FIGS. 3A and 3B, an electronic device 330 (e.g., electronic device 101 of FIG. 1 or electronic device 200 of FIG. 2) may be communication-connected to external devices 310 and 320. Referring to FIG. 3A, the electronic device 330 may be inserted into and electrically connected to the external device 340 in a deck type. Here, the electronic device 330 may be electrically connected to the external device 340 by a pin type terminal (e.g., 5 pins or micropins). Direct connection between the electronic device 330 and the external device 340 in the deck type may be a tethered type connection. In case that the tethered type connection is made, the external device 340 may be provided with antennas which can be communication-connected to other external devices 310 and 320. For example, the external device 340 may be provided with three or more UWB antennas. According to an embodiment, the external device 340 may support the control of the other external devices 310 and 320 using the result of the calculation of the electronic device 330.

Referring to FIGS. 3A and 3B, an HMD device (e.g., 310) may be referred to, for example, as an external device against the electronic device 330. Here, the HMD device may be interchangeably described as a first external device. Various types of HMD devices may be provided to be worn on a part of a user's body. For example, the HMD device may include a band formed of an elastic material, and may come in close contact with the surrounding area of eye of the user's face. According to an embodiment, the HMD device may be produced in the form of eyeglass, helmet, or strap.

According to various embodiments, the HMD device 310 may be provided with a processor, a camera, a sensor, and an antenna (e.g., UWB antenna). The elements of the HMD device are not limited thereto, and the antenna may be provided on the communication module to support communication connection with other devices or to transmit and receive data to and from the other devices.

Referring to FIGS. 3A and 3B, a controller device (e.g., 320) may be called an external device against the electronic device 330. Here, the controller device may be interchangeably called as a second external device. The controller device may be configured to transmit and receive signals being transmitted from the HMD device, the electronic device, and/or a tracker. Further, an input of the controller device may be transmitted to the communication-connected HMD device, electronic device, and/or tracker.

According to various embodiments, a plurality of controller devices 320 may be provided. For example, the controller devices may be produced and provided in left and right hand-held shapes, or may be configured as a left controller device 321 and a right controller device 322. During a content playback of the electronic device, the controller device 320 may provide the user of the electronic device with a moving experience in a virtual space by controlling the movement on the content. Further, the controller device may be mounted, attached, or provided on the hand, wrist, or clothes of the user of the electronic device, and may provide a control-performing experience in a provided location.

According to various embodiments, the controller device 320 may be provided with a processor, a light-emitting element (e.g., LED element), a sensor, and an antenna (e.g., UWB antenna). The elements of the controller device are not limited thereto, and the antenna may be provided on the communication module to support communication connection with other devices or to transmit and receive data to and from the other devices.

Referring to FIG. 3A, the electronic device 330 may execute the content capable of providing the experience of the virtual space. For example, the experience of the virtual space may include an experience of a virtual 3D image, such as VR or AR. According to an embodiment, the electronic device may include at least a part of the configuration and/or function of the electronic device of FIG. 1.

Referring to FIGS. 3A and 3B, a device for providing the experience of the virtual space may be provided using various methods. The method illustrated in FIG. 3A may be a tethered method. In case of the tethered method, as illustrated in FIG. 3A, a separate dock (e.g., deck 340) may be necessary. Of the tethered method, a method capable of inserting the electronic device 330 into the HMD device may be used. The method for inserting the electronic device 330 (e.g., smartphone) into the HMD device may not require a separate camera or sensor to be provided on the HMD device, and may use the elements of the electronic device 330.

Referring to FIG. 3B, a device for providing the experience of the virtual space may include the HMD device and the controller device only. For example, the device may implement 6 degrees of freedom while communicating with the controller device using a sensor, a camera, and an antenna that can be provided in the HMD device.

According to an embodiment, in a similar manner to the tethered method of FIG. 3A, the location calculation of the external device (e.g., the HMD device and the controller device) using the processor of the electronic device 330 may be performed through a server. For example, a first coordinate and a second coordinate may be obtained by calculating, through the server, the result of the signal transmission and reception of the first external device 310 and the second external device 320 communication-connected to the electronic device 330. The server may transmit information about the first coordinate and the second coordinate to the electronic device 330 and the first external device 310.

Figure 4:
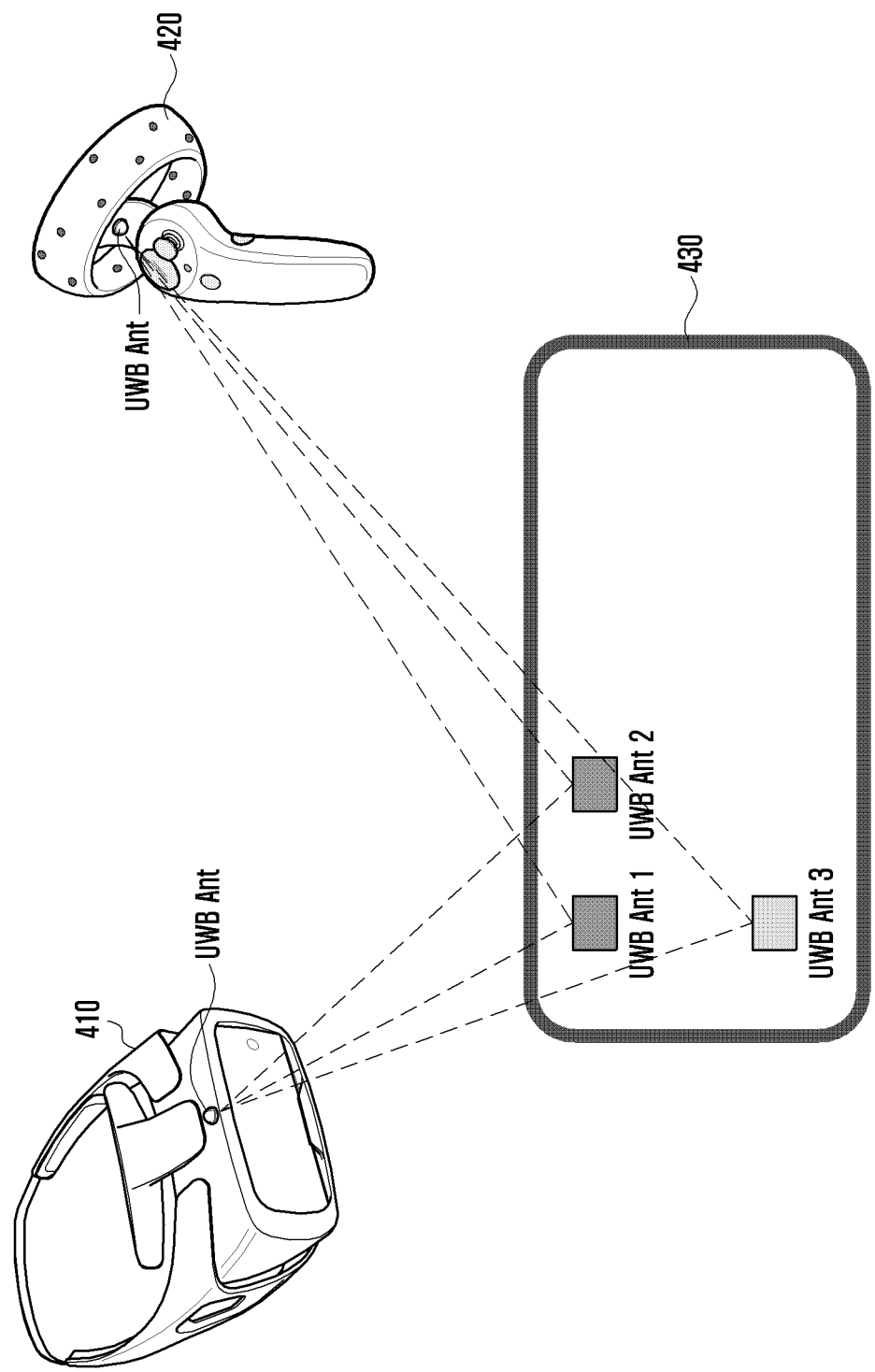
FIG. 4 is a diagram illustrating an external device transmitting and receiving data to and from a plurality of antennas of an electronic device according to various embodiments.

FIG. 4 is a diagram illustrating an external device transmitting and receiving data to and from a plurality of antennas of an electronic device according to various embodiments.

Referring to FIG. 4, an electronic device 430 (e.g., electronic device 101 of FIG. 1, electronic device 200 of FIG. 2, or electronic device 330 of FIG. 3A) may be communication-connected to a first external device 410 (e.g., HMD device) and a second external device 420 (e.g., controller device). Here, the communication connection may refer, for example, to a communication connection using a short-range communication module.

According to various embodiments, the electronic device 430 may transmit and receive signals to and from external devices 410 and 420 (e.g., external devices 310 and 320 of FIG. 3A) through three or more antennas (e.g., first antenna 221, second antenna 222, and third antenna 223 of FIG. 2) provided in the UWB communication module (e.g., UWB communication module 220 of FIG. 2). Here, the signal may include data, and may be a signal for positioning.

According to various embodiments, the electronic device 430 may transmit and receive data to and from the external devices 410 and 420 using the plurality of antennas (e.g., antenna module 197 of FIG. 1, first antenna 221, second antenna 222, and third antenna 223 of FIG. 2, UWB Ant1, UWB Ant2, and UWB Ant3) which may be provided in the UWB communication module (e.g., communication module 190 of FIG. 1 or UWB communication module 220 of FIG. 2). Here, the data being transmitted and received may be used to measure the distance between the electronic device and the external device and/or the direction thereof. For example, in order to measure the distance from the external device, the UWB communication module may be configured to perform one-way ranging, two-way ranging, and/or time difference of arrival (TDoA) measurement. The one-way ranging may be measurement of the distance between the electronic device and the external device by measuring a time for the electronic device 430 to transmit the signal and a time for the external devices 410 and 420 to receive the transmitted signal. The two-way ranging may be measurement of the distance between the electronic device and the external device by reducing an error of time measurement through several times signal transmission/reception by the electronic device and the external device. The TDoA measurement may be calculation of the distance by measuring a relative difference in signal arrival time depending on the distances from two or more signal sources.

According to various embodiments, the electronic device 430 may transmit the signal to the first external device 410 using the plurality of antennas. Here, in the same or similar manner as the electronic device, the first external device 410 may be provided with one or more UWB antennas. The electronic device 430 may transmit the signal to the first external device 410 using at least a part of the first antenna to the third antenna. The first external device having received the transmitted signal may be configured to transmit the signal to the electronic device using the provided UWB antenna. Here, the signal transmission/reception between the electronic device and the first external device may be to carry and send time information for measuring the distance between them. According to an embodiment, the signals being transmitted to the first external device using the first antenna to the third antenna of the electronic device 430 may not be transmitted simultaneously. According to an embodiment, the signals being transmitted to the first external device using the first antenna to the third antenna of the electronic device 430 may be transmitted simultaneously. If the signals being transmitted to the first external device using the first antenna to the third antenna of the UWB communication module are a first signal to a third signal, the signals being transmitted from the first external device to the electronic device may be received by the first antenna to the third antenna having transmitted the individual signals (e.g., first signal to third signal). For example, if the first signal is transmitted to the first external device using the first antenna, the UWB antenna of the first external device may transmit a response signal to the first antenna of the electronic device after receiving the first signal.

According to various embodiments, the electronic device 430 may transmit the signal to the second external device 420 using the plurality of antennas. Here, in the same or similar manner as the electronic device, the second external device 420 may be provided with one or more UWB antennas. The electronic device 430 may transmit the signal to the second external device 420 using at least a part of the first antenna to the third antenna. The second external device having received the transmitted signal may be configured to transmit the signal to the electronic device using the provided UWB antenna. Here, the signal transmission/reception between the electronic device and the second external device may be to carry and send time information for measuring the distance between them. According to an embodiment, the signals being transmitted to the second external device using the first antenna to the third antenna of the electronic device 430 may not be transmitted simultaneously. According to an embodiment, the signals being transmitted to the first external device using the first antenna to the third antenna of the electronic device 430 may be transmitted simultaneously. If the signals being transmitted to the second external device using the first antenna to the third antenna of the UWB communication module are a first signal to a third signal, the signals being transmitted from the second external device to the electronic device may be received by the first antenna to the third antenna having transmitted the individual signals (e.g., first signal to third signal). For example, if the first signal is transmitted to the second external device using the first antenna, the UWB antenna of the second external device may transmit a response signal to the first antenna of the electronic device after receiving the first signal.

Referring to FIG. 4, the UWB communication module that may be provided in the electronic device 430 may also be provided in the tethered-type deck-shaped external device (e.g., external device 340 of FIG. 3A). For example, the electronic device may transmit and receive the signals to and from the HMD device (e.g., first external device) and/or the controller device (e.g., second external device) through the first antenna to the third antenna using the UWB communication module of the external device.

According to an embodiment, the first external device 410 may be provided with three or more UWB antennas in the same or similar manner as the three or more antennas (e.g., first antenna 221, second antenna 222, and third antenna 223 of FIG. 2) included in the electronic device. In this case, the first external device may measure the distance between the first external device and the second external device 420 by performing the same or similar operation as the operation of the electronic device 410. In this case, even if there is not the electronic device 430, the mutual distance measurement can be performed only by the first external device 410 and the second external device 420. For example, the antennas provided in the first external device may be called the first antenna, the second antenna, and the third antenna, and the respective antennas may measure the distance between them by transmitting and receiving data and/or signals to and from the UWB antenna provided in the second external device. According to various embodiments, the first external device 410 may transmit the signals to the second external device 420 using the plurality of antennas. The first external device 410 may transmit the signals to the second external device 420 using at least a part of the first antenna to the third antenna. The second external device having received the transmitted signals may be configured to transmit the signals to the first external device using the provided UWB antenna. Here, the signal transmission/reception between the first external device and the second external device may be to carry and send time information for measuring the distance between them. According to an embodiment, the signals being transmitted to the second external device using the first antenna to the third antenna of the first external device 410 may not be transmitted simultaneously. According to an embodiment, the signals being transmitted to the first external device using the first antenna to the third antenna of the electronic device may be transmitted simultaneously. If the signals being transmitted to the second external device using the first antenna to the third antenna of the UWB communication module are the first signal to the third signals, the signals being transmitted from the second external device to the electronic device may be received by the first antenna to the third antenna having transmitted the individual signals (e.g., first signal to third signal). For example, if the first signal is transmitted to the second external device using the first antenna, the UWB antenna of the second external device may transmit a response signal to the first antenna of the electronic device after receiving the first signal.

Figure 5:
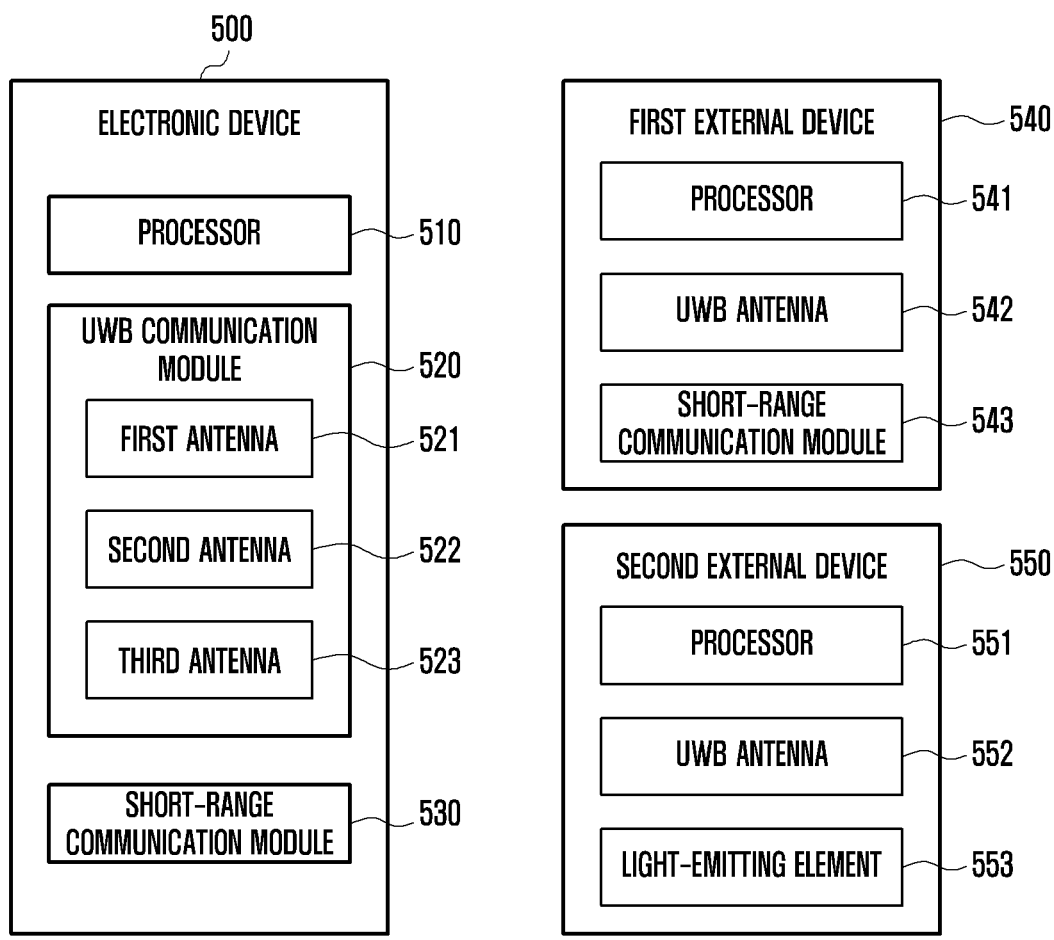
FIG. 5 is a block diagram illustrating example configurations of an electronic device and an external device for 6DoF implementation according to various embodiments.

FIG. 5 is a block diagram illustrating an example configuration of an electronic device and an external device for 6DoF implementation according to various embodiments.

Referring to FIG. 5, an electronic device 500 (e.g., electronic device 101 of FIG. 1, electronic device 200 of FIG. 2, electronic device 330 of FIG. 3A, or electronic device 430 of FIG. 4) may include a processor (e.g., including processing circuitry) 510 (e.g., processor 120 of FIG. 1 or processor 210 of FIG. 2), a UWB communication module (e.g., including at least one antenna) 520 (e.g., communication module 190 of FIG. 1 or UWB communication module 220 of FIG. 2), and a short-range communication module (e.g., including communication circuitry) 530 (e.g., communication module 190 of FIG. 1 or short-range communication module 230 of FIG. 2), and some of the illustrated elements may be omitted or replaced. The electronic device may include at least a part of the configuration and/or function of the electronic device 101 of FIG. 1, the electronic device 200 of FIG. 2, electronic device 330 of FIG. 3A, and/or the electronic device 430 of FIG. 4.

According to various embodiments, the processor 510 may include various processing circuitry and be configured to be able to perform calculation or data processing for the control and/or communication of respective elements of the electronic device 500, and may include at least a part of the elements and/or function of the processor 120 of FIG. 1 and/or the processor 210 of FIG. 2. The processor may be functionally, operatively, and/or electrically connected to the internal elements of the electronic device including the UWB communication module and the short-range communication module.

According to various embodiments, the UWB communication module 520 (e.g., communication module 190 of FIG. 1 or UWB communication module 220 of FIG. 2) may include various communication circuitry and can perform communication with a wide bandwidth (e.g., equal to or higher than 3.1 GHz and lower than 10.6 GHz) using UWB antennas (e.g., first antenna 521, second antenna 522, and third antenna 523). According to an embodiment, the UWB communication module may perform communication for the purpose of data transmission and reception, and may enter a sleep state or a standby state while the data transmission and reception through the short-range communication module is performed. In this case, through reduction of a power being consumed by the UWB communication module, the power efficiency of the electronic device can be increased. The UWB communication module according to various embodiments of the disclosure may include at least a part of the configuration and/or function of the communication module 190 of FIG. 1 and/or the UWB communication module 220 of FIG. 2.

According to various embodiments, the UWB communication module 520 may include various circuitry connected to the plurality of antennas (e.g., first antenna 521, second antenna 522, and third antenna 523) (e.g., antenna module 197 of FIG. 1 or a plurality of antennas 221 to 223 of FIG. 2). The UWB communication module may transmit data using at least a part of the first antenna to the third antenna. The UWB communication module may receive data using at least a part of the first antenna to the third antenna. According to an embodiment, the antenna being used to transmit the data may be the same as the antenna being used to receive the data. According to an embodiment, the antenna used for transmitting the data and an antenna used for receiving data may be different from each other.

Referring to FIG. 5, the first antenna to the third antenna 521, 522, and 523 may be UWB antennas. For example, the first antenna to the third antenna may be antennas capable of performing UWB communication. The UWB antenna may refer, for example, to an antenna supporting UWB services. According to an embodiment, a part of the first antenna to the third antenna 521, 522, and 523 may be a different kind of antenna from the remaining antennas. Depending on the kind of antenna, antenna disposition locations and/or characteristics may differ from each other. For example, the first antenna to the third antenna may include metal antennas, patch antennas, and/or laser direct structuring (LDS) antennas. According to an embodiment, the first antenna to the third antenna 521, 522, and 523 may be the same kind of antennas.

According to an embodiment, the electronic device 500 may include different kinds of antennas to provide accurate UWB services. For example, the first antenna may include the metal antenna, the second antenna may include the patch antenna, and the third antenna may include the LDS antenna. According to an embodiment, the first antenna to the third antenna may be the same kind of antennas.

According to various embodiments, the short-range communication module 530 (e.g., communication module 190 of FIG. 1 or short-range communication module 230 of FIG. 2) may include various communication circuitry and perform communication with an external device located in a short distance. For example, if the electronic device and the external device are located in a distance enough to be connected to each other so as to perform short-range communication, they can be connected to communicate with each other through the short-range communication module. According to an embodiment, the short-range communication module 530 may support the communication connection utilizing methods, such as Bluetooth, Bluetooth low energy, and ZigBee. Such communication connection methods are merely examples, and the embodiment is not limited thereto. The communication module according to various embodiments of the disclosure may include at least a part of the configuration and/or function of the communication module 190 of FIG. 1 and/or the short-range communication module 230 of FIG. 2.

According to an embodiment, the short-range communication module 530 (e.g., communication module 190 of FIG. 1 or short-range communication module 230 of FIG. 2) may transmit and receive data to and from an external device (e.g., first external device 540 and second external device 550). For example, when the UWB communication module 520 is in a sleep state or in a standby state, the short-range communication module 530 may be communication-connected to the external device to transmit and receive data to and from the external device. According to an embodiment, when the UWB communication module 520 is activated to be in a communicable state, the short-range communication module 530 may be communication-connected to the external device to transmit and receive data to and from the external device. Here, the short-range communication module 530 may be configured as a higher priority than the UWB communication module 520 to transmit and receive data to and from the external device. According to an embodiment, the short-range communication module 530 may be configured to perform data transmission/reception for the different purpose from that of the UWB communication module 520. For example, the UWB communication module may be configured to perform data transmission/reception for the purpose of measuring the distance between the electronic device and the external device. The short-range communication module may be configured to perform data transmission/reception for all purposes excluding the distance measurement between the electronic device and the external device.

Referring to FIG. 5, the first external device 540 (e.g., HMD device 310 of FIG. 3) may be an HMD device. The first external device may include a processor (e.g., including processing circuitry) 541 (e.g., processor 120 of FIG. 1), a UWB antenna 542 (e.g., communication module 190 of FIG. 1), and a short-range communication module (e.g., including communication circuitry) 543 (e.g., communication module 190 of FIG. 1), and some of the illustrated elements may be omitted or replaced. The first external device may include at least a part of the configuration and/or function of the electronic device 101 of FIG. 1.

Referring to FIG. 5, the second external device 550 (e.g., controller device 320 of FIG. 3) may be a controller device. The second external device may include a processor (e.g., including processing circuitry) 551 (e.g., processor 120 of FIG. 1), a UWB antenna 552 (e.g., communication module 190 of FIG. 1), a short-range communication module (not illustrated) (e.g., communication module 190 of FIG. 1), and a light-emitting element 553 (e.g., LED element), and some of the illustrated elements may be omitted or replaced. The second external device may include at least a part of the configuration and/or function of the electronic device 101 of FIG. 1.

According to various embodiments, generation of the first coordinate system through the processor 510 of the electronic device may be performed by triangulation. For example, the plurality of antennas 521 to 523 of the electronic device may be fixed, and the locations thereof may not be changed. A first distance may be measured by the signal being transmitted and received from the first antenna 521 to the UWB antenna 542 of the first external device. A second distance may be measured by the signal being transmitted and received from the second antenna 522 to the UWB antenna 542 of the first external device. A third distance may be measured by the signal being transmitted and received from the third antenna 523 to the UWB antenna 542 of the first external device. Together with information about the first distance, the second distance, and the third distance, the processor 510 may identify information about a distance (e.g., fourth distance) between the first antenna and the second antenna, a distance (e.g., fifth distance) between the second antenna and the third antenna, and a distance (e.g., sixth distance) between the first antenna and the third antenna. According to an embodiment, the information about the fourth distance to the sixth distance may be stored in a memory when the electronic device is provided by a manufacturer of the electronic device. According to an embodiment, the processor 510 may calculate the information about the fourth distance to the sixth distance through signal transmission/reception among the first antenna to the third antenna 521 to 523.

According to various embodiments, the processor 510 of the electronic device may perform triangulation using the information about the first distance to the sixth distance. For example, the processor 510 may calculate an angle of each side (e.g., side of a triangular shape) through a tetrahedron having locations of the first antenna to the third antenna 521 to 523 and the UWB antenna 542 of the first external device as vertices. The reason why the processor 510 can calculate the angles is that the angles can correspond to lengths of sides of the tetrahedron through the first distance to the sixth distance. The processor 510 may calculate the location of the first external device in a state where the location of the electronic device is taken as the origin based on the result of calculating the side length of the tetrahedron and the angle of each side. The location of the first external device as calculated above may be the first coordinate.

According to various embodiments, the plurality of antennas 521 to 523 of the electronic device may be fixed, and the locations thereof may not be changed. A seventh distance may be measured by the signal being transmitted and received from the first antenna 521 to the UWB antenna 552 of the second external device. An eighth distance may be measured by the signal being transmitted and received from the second antenna 522 to the UWB antenna 552 of the second external device. A ninth distance may be measured by the signal being transmitted and received from the third antenna 523 to the UWB antenna 552 of the second external device. Together with information about the seventh distance, the eighth distance, and the ninth distance, the processor 510 may identify information about the distance (e.g., fourth distance) between the first antenna and the second antenna, the distance (e.g., fifth distance) between the second antenna and the third antenna, and the distance (e.g., sixth distance) between the first antenna and the third antenna. According to an embodiment, the information about the fourth distance to the sixth distance may be stored in the memory when the electronic device is provided by the manufacturer of the electronic device. According to an embodiment, the processor 510 may calculate the information about the fourth distance to the sixth distance through signal transmission/reception among the first antenna to the third antenna 521 to 523.

According to various embodiments, the processor 510 of the electronic device may perform the triangulation using the information about the fourth distance to the sixth distance and the information about the seventh distance to the ninth distance. For example, the processor 510 may calculate the angle of each side (e.g., side of a triangular shape) through the tetrahedron having locations of the first antenna to the third antenna 521 to 523 and the UWB antenna 552 of the second external device as vertices. The reason why the processor 510 can calculate the angles is that the angles can correspond to the lengths of the sides of the tetrahedron through the information about the fourth distance to the sixth distance and the seventh distance to the ninth distance. The processor 510 may calculate the location of the second external device in a state where the location of the electronic device is taken as the origin based on the result of calculating the side length of the tetrahedron and the angle of each side. The location of the second external device as calculated above may be the second coordinate.

According to various embodiments, the processor 510 of the electronic device may generate the first coordinate system having the location of the electronic device as the origin using the first coordinate and the second coordinate calculated through the triangulation. Further, the processor 510 may generate the second coordinate system based on the first coordinate system. For example, in order to easily express a relative location (e.g., coordinate) of the second external device against the first external device, a method that takes the first external device as a reference point may be selected. The processor 510 may generate the second coordinate system that changes the first coordinate as the origin using the coordinate (e.g., first coordinate) of the first external device and the coordinate (e.g., second coordinate) of the second external device on the first coordinate system having taken the location of the electronic device 500 as the origin.

Figure 6:
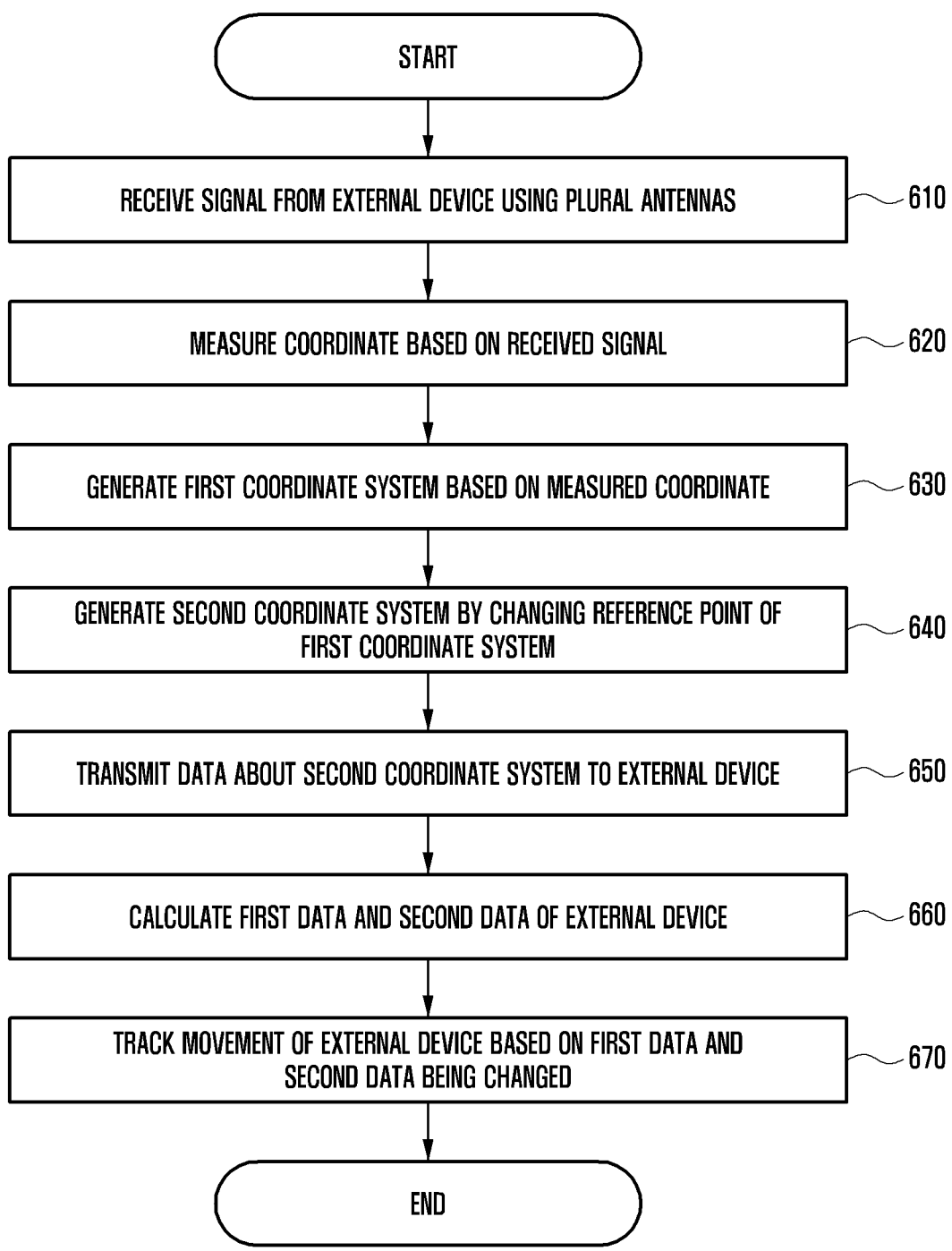
FIG. 6 is a flowchart illustrating example operations of coordinate implementation of an electronic device and position tracking of an external device according to various embodiments.

FIG. 6 is a flowchart illustrating an example method for coordinate implementation of an electronic device and position tracking of an external device according to various embodiments.

Referring to FIG. 6, the electronic device (e.g., electronic device 101 of FIG. 1, electronic device 200 of FIG. 2, electronic device 330 of FIG. 3A, electronic device 430 of FIG. 4, or electronic device 500 of FIG. 5) may transmit signals to the external device (e.g., HMD device or controller device) using the UWB communication module. In this case, the signals being transmitted may be transmitted from the individual antennas (e.g., first antenna to third antenna), may be the first signal to the third signal, and may not be transmitted simultaneously. Operation 610 may be an operation of receiving the signals being transmitted from the external device having received the first signal to the third signal. For example, the electronic device may receive, from the first external device through the plurality of antennas (e.g., antenna module 197 of FIG. 1, the plurality of antennas 221 to 223 of FIG. 2, or the plurality of antennas 521 to 523 of FIG. 5), the signal being transmitted after the first signal is received, the signal being transmitted after the second signal is received, and/or the signal being transmitted after the third signal is received. According to an embodiment, the electronic device may receive, from the second external device through the plurality of antennas (e.g., antenna module 197 of FIG. 1, the plurality of antennas 221 to 223 of FIG. 2, or the plurality of antennas 521 to 523 of FIG. 5), the signal being transmitted after the first signal is received, the signal being transmitted after the second signal is received, and/or the signal being transmitted after the third signal is received.

Referring to FIG. 6, operation 620 may be for the processor (e.g., processor 120 of FIG. 1, processor 210 of FIG. 2, or processor 510 of FIG. 5) of the electronic device to measure coordinates based on the signals received from the UWB antenna of the first external device and/or the second external device. In this case, the coordinates may correspond to the coordinates of the first external device and the second external device. For example, the location of the electronic device may be the origin (e.g., reference point), and the operation 620 may be to measure the coordinates of the first external device and the second external device. The coordinate of the first external device may refer, for example, to the first coordinate, and the coordinate of the second external device may refer, for example, to the second coordinate.

Referring to FIG. 6, operation 630 may refer to the processor of the electronic device generating the first coordinate system based on the measured first coordinate and second coordinate. In this case, the first coordinate system may correspond to the coordinate system in which the location of the first external device and the location of the second external device correspond to the first coordinate and the second coordinate in a state where the location of the electronic device is taken as the origin. For example, the processor may be configured to measure the locations of the first external device and the second external device using the UWB service, and to calibrate the coordinate system in a state where the location of the electronic device is taken as the origin.

Referring to FIG. 6, the processor, at operation 640, may generate the second coordinate system by changing the reference point of the first coordinate system. The change of the reference point may be the change of the location of the origin. For example, the processor may generate the second coordinate system by changing the first external device or the second external device as the origin based on the first coordinate system generated in a state where the location of the electronic device is taken as the origin. In this case, the processor may relatively measure the changed coordinate of another external device from the external device in a state where the first coordinate or the second coordinate of the first external device or the second external device is taken as the reference.

Referring to FIG. 6, operation 650 may be to transmit data about the second coordinate system to the external device. According to an embodiment, the origin of the second coordinate system may be the first external device. The processor of the electronic device may transmit information (e.g., data) about the generated second coordinate system to the first external device that is taken as the origin through the short-range communication module. According to an embodiment, the origin of the second coordinate system may be the second external device. The processor of the electronic device may transmit the information about the generated second coordinate system to the second external device taken as the origin through the short-range communication module.

Referring to FIG. 6, operation 660 may be an operation at which the processor of the electronic device calculates first data and second data of the external device. The first data may include posture information, and the second data may include location information. The posture information may be, for example, information about a rotational motion based on x, y, and z axes of the external device. According to an embodiment, the origin of the second coordinate system may be the first external device. In this case, the first data may be the posture information of the second external device, and the second data may be the location information of the second external device. The location information may be, for example, information about a translational motion based on x, y, and z axes of the external device. According to an embodiment, the origin of the second coordinate system may be the second external device. In this case, the first data may be the posture information of the first external device, and the second data may be the location information of the first external device. According to various embodiments, the 6DoF of the external device may be implemented based on the first data and the second data. According to an embodiment, the external device (e.g., first external device) may include various sensors (e.g., gravity sensor, acceleration sensor, and gyro sensor). In this case, the processor of the electronic device may receive a sensing value detected by the sensor of the first external device, and may calculate the first data and the second data of the external device using the received sensing value.

According to various embodiments, the 6 degrees of freedom (6DoF) may refer, for example, to the concept that can be provided in a virtual space and includes not only the translational motion (e.g., up, down, left, right, back and forth movement) but also the rotational motion. As the concept in contrast with the 6 degrees of freedom, 3 degrees of freedom (3DoF) may exist, and in the 3 degrees of freedom, only the trajectory tracking may be possible for the rotational motion excluding the translational motion. In the device providing an experience of the virtual space, there may be a motion-existing device (e.g., HMD device or controller device), and thus by tracking the controller device through implementation of the 6 degrees of freedom, content movement being provided in addition to the user's movement (e.g., movement of the HMD device) can be achieved together.

Referring to FIG. 6, operation 670 may be an operation in which the processor of the electronic device tracks the movement of the external device through the change of the first data and the second data. According to an embodiment, the origin of the second coordinate system may be the first external device. In this case, the first data and the second data may be changed depending on the movement of the second external device. The processor may track the movement of the second external device by measuring the first data and the second data being changed in accordance with a predetermined period. According to an embodiment, the origin of the second coordinate system may be the second external device. In this case, the first data and the second data may be changed depending on the movement of the first external device. The processor may track the movement of the first external device by measuring the first data and the second data being changed in accordance with the predetermined period.

Figure 7A:
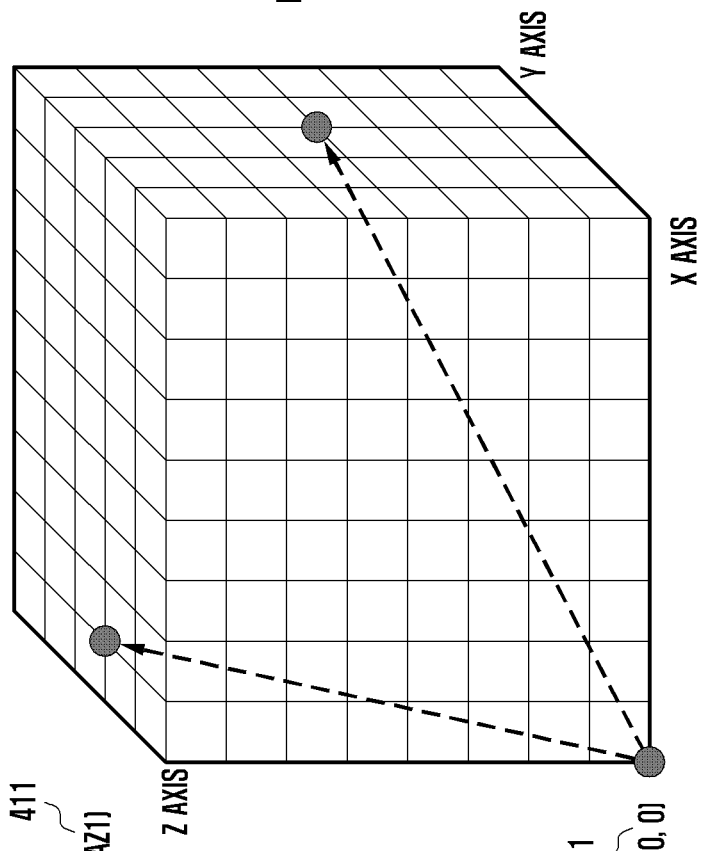
FIG. 7A is a diagram illustrating an example method for implementing 6DoF according to various embodiments.
Figure 7A:
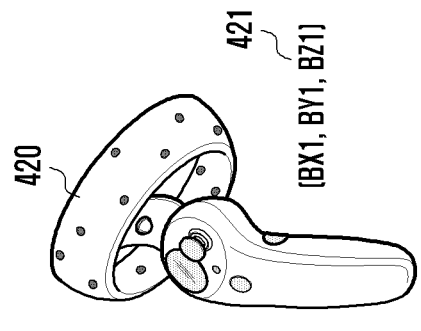
Figure 7A:
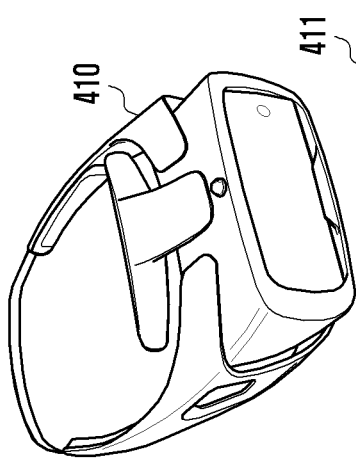
Figure 7A:
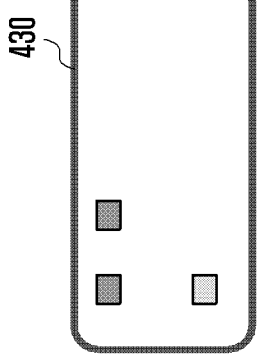
Figure 7B:
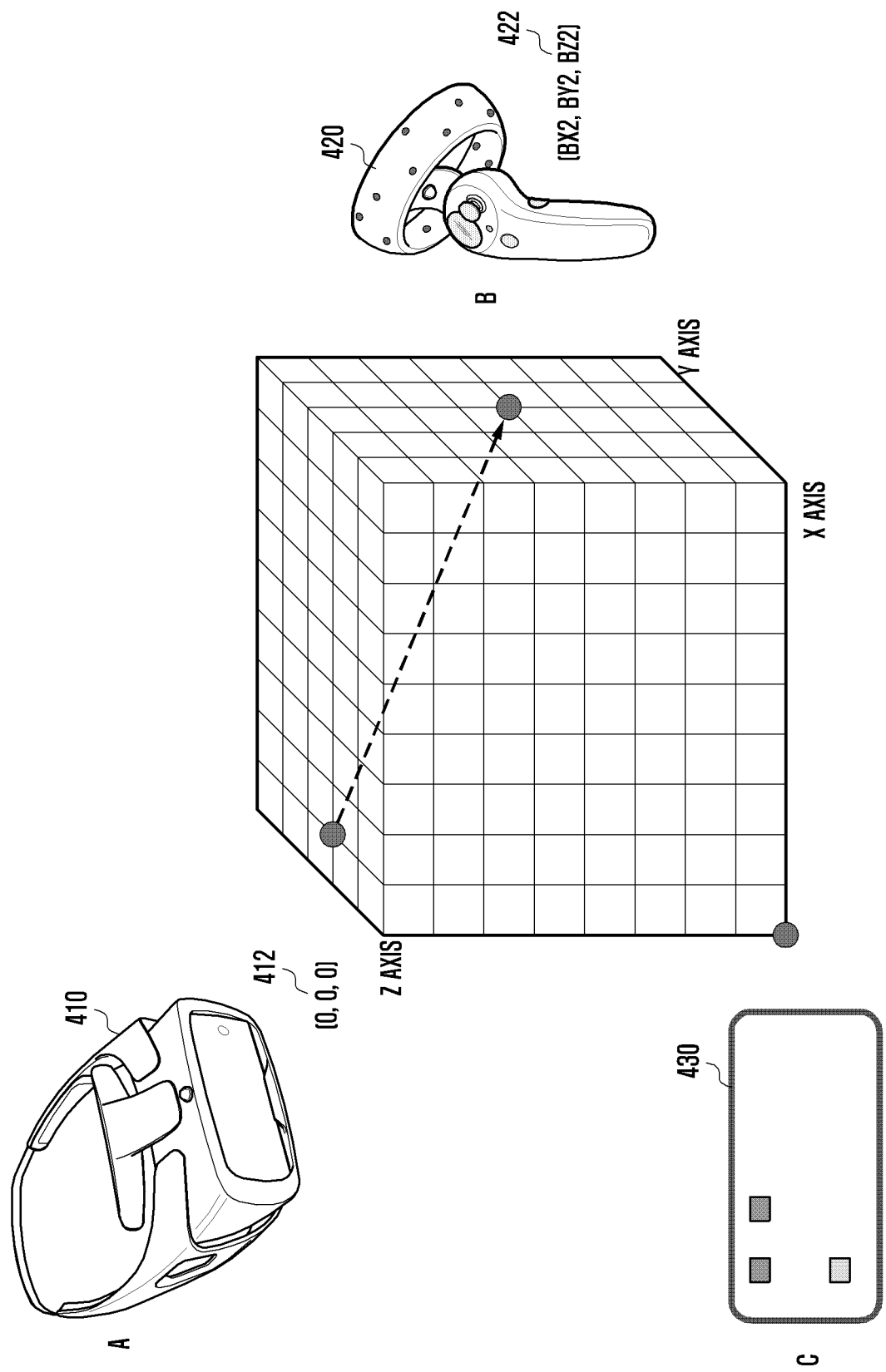
FIG. 7B is a diagram illustrating an example method for implementing 6DoF according to various embodiments.

FIGS. 7A and 7B are diagrams illustrating example methods for implementing 6DoF according to various embodiments.

FIG. 7A may illustrate the first coordinate system generated in a state where the electronic device 430 is taken as the origin. For example, the coordinate 431 of the electronic device 430 (C) may be (0, 0, 0), the coordinate 411 of the first external device 410 (A) may be (AX1, AY1, AZ1), and the coordinate 421 of the second external device 420 may be (BX1, BY1, BZ1). The first coordinate may correspond to (AX1, AY1, AZ1) 411, and the second coordinate may correspond to (BX1, BY1, BZ1) 421.

FIG. 7B may illustrate the second coordinate system generated in a state where the first external device 410 is taken as the origin. For example, the coordinate 412 of the first external device 410 (A) may be (0, 0, 0), and the coordinate 422 of the second external device 420 may be (BX2, BY2, BZ2).

According to various embodiments, the first coordinate system is formed in a state where the electronic device 430 is taken as the origin, and thus may refer, for example, to absolute coordinates. For example, since the device that calibrates the coordinate system is the electronic device (e.g., processor of the electronic device), the coordinate system may be the coordinate system generated based on the absolute coordinate. The second coordinate system is formed by changing the first external device 140 (e.g., HMD device) as the origin, and thus may refer, for example, to relative coordinates. For example, since the device that recalibrates the coordinate system is the electronic device, and the origin is not the location of the electronic device, the second coordinate system may be the coordinate system generated based on the relative coordinate.

Referring to FIG. 7B, the coordinate of the second external device 420 may be measured in a state where the first external device 410 is taken as the origin. For example, since the coordinate of the first external device is (0, 0, 0), the coordinate of the second external device may be measured using the first coordinate and the second coordinate of FIG. 7A. Since the first coordinate of FIG. 7A is (AX1, AY1, AZ1) 411, and the second coordinate is (BX1, BY1, BZ1) 421, the relative coordinate may be calculated. The processor of the electronic device 430 may calculate the coordinate of the second external device on the second coordinate system in a state where the first external device is taken as the origin through the calculation process of (BX1−AX1, BY1−AY1, BZ1−AZ1). According to an embodiment, the first coordinate may be (1, 2, 8), and the second coordinate may be (9, 3, 4). The processor may calculate the coordinate of the second external device on the second coordinate system as (9−1, 3−2, 4−8)=(8, 1, −4).

According to various embodiments, the electronic device 430 may transmit data about the second coordinate system to the first external device using the short-range communication module. For example, the processor of the electronic device 430 may transmit the data about the second coordinate system to the first external device that is the origin of the second coordinate system using the short-range communication module. According to an embodiment, the processor of the electronic device 430 may transmit the data about the second coordinate system to the first external device that is the origin of the second coordinate system using the UWB communication module.

According to various embodiments, the electronic device 430 may calculate the coordinates of the first external device and the second external device which move on the second coordinate system in a predetermined period. For example, the processor of the electronic device may calculate the coordinate of the second external device being changed on the second coordinate system in correspondence to the movement of the first external device and the second external device. According to an embodiment, the period of the coordinate calculation of the second external device being changed on the second coordinate system may be configured shorter than the period of the movement of the first external device and/or the second external device. For example, the processor of the electronic device may configure a short period of signal transmission/reception through the UWB communication module to be close to real time as an initial setting value by a manufacturer of the electronic device. Configuration of the short period of the signal transmission/reception through the UWB communication module may be equal to or similar to the configuration of the short period of the calculation of the first coordinate system and the second coordinate system and the calculation to track the movement of the second external device on the second coordinate system.

According to various embodiments, the processor of the electronic device may be configured to implement the 6 degrees of freedom (6DoF) by tracking the movement (e.g., movement trajectory) of the first external device and the second external device in the predetermined period (e.g., real time). For example, the 6DoF may be used to track the translational motion of x, y, and z axes of the second external device and/or the rotational motion of the respective axes based on the first external device. According to an embodiment, the processor of the electronic device may calculate the first data and the second data of the second external device. The first data may include the posture information of the second external device on the second coordinate system. The second data may include the location information of the second external device on the second coordinate system. According to an embodiment, the first data and the second data of the second external device may be used for the 6DoF implementation. For example, in case that the motion of the second external device comes down from top while drawing a spiral, the 6DoF of the second external device can be implemented through the first data and the second data.

Figure 8:
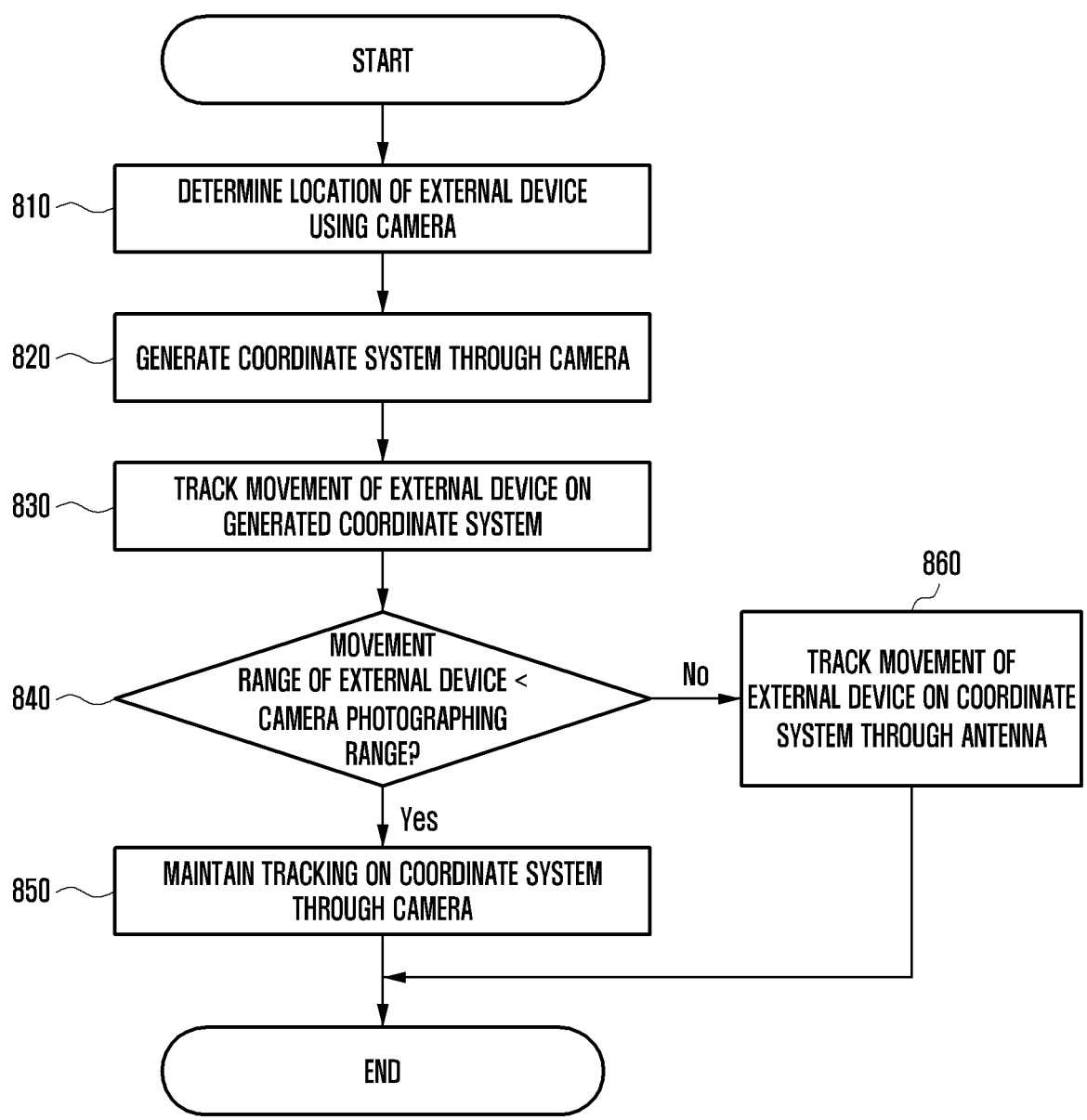
FIG. 8 is a flowchart illustrating an example method used for an electronic device to determine a location of an external device according to various embodiments.

FIG. 8 is a flowchart illustrating an example method for an electronic device to determine a location of an external device according to various embodiments.

According to various embodiments, the electronic device (e.g., electronic device 101 of FIG. 1, electronic device 200 of FIG. 2, electronic device 330 of FIG. 3A, electronic device 430 of FIG. 4, or electronic device 500 of FIG. 5) may include at least one or more cameras (e.g., camera module 180 of FIG. 1 and camera 240 of FIG. 2). For example, the electronic device may include a plurality of cameras including a depth camera and an optical camera. According to an embodiment, the electronic device may track the movement of the external device using the plurality of cameras. For example, the processor of the electronic device may be configured to calculate the coordinates of the external device being received through the plurality of cameras. According to an embodiment, the electronic device may track the movement of the external device using an illuminance sensor (e.g., sensor module 176 of FIG. 1). For example, the processor of the electronic device may track the movement of the external device by detecting a light-emitting element of the external device (e.g., controller device) through the illuminance sensor. According to an embodiment, the electronic device may track the movement of the external device using the UWB communication module (e.g., communication module 190 of FIG. 1, UWB communication module 220 of FIG. 2, or UWB communication module 520). For example, the processor of the electronic device may be configured to calculate the coordinate of the external device through the signals being transmitted and received to and from the external device through the UWB communication module. According to an embodiment, the electronic device may track the movement of the external device using the camera, sensor, and/or UWB communication module. For example, the processor of the electronic device may make the methods for tracking the movement of the external device different from each other according to certain conditions.

Referring to FIG. 8, the electronic device may determine the location of the external device using the camera (810). The processor (e.g., processor 120 of FIG. 1, processor 210 of FIG. 2, or processor 510 of FIG. 5) of the electronic device may be configured to calculate the location of the external device (e.g., first external device and second external device) moving in the viewing angle of the camera. For example, the processor may determine the location of the external device by identifying an image of the external device being received through the camera. According to various embodiments, the external device (e.g., first external device) may be provided with the camera, and the external device may transmit an image of another external device (e.g., second external device) moving in the viewing angle of the camera of the external device to the processor of the electronic device. In this case, the electronic device may determine the location of the second external device by identifying the image received from the first external device. According to an embodiment, the photographing period for the processor of the electronic device to determine the location (e.g., coordinate) of the external device or the location-determining period may be preconfigured. For example, the photographing period or the location-determining period (e.g., period of location calculation) may be configured to be shorter in consideration of the movement frequency of the external device.

Referring to FIG. 8, the processor of the electronic device may generate the coordinate system including the first external device and the second external device based on the electronic device (e.g., in a state where the location of the electronic device is taken as the origin) (820). For example, the processor may generate the third coordinate system by calculating the coordinates of the first external device and the second external device based on the electronic device.

According to various embodiments, the processor of the electronic device may track the movement of the external device (e.g., controller device) on the generated third coordinate system (830). For example, the processor may calculate the coordinates of the first external device and the second external device on the third coordinate system generated in a state where the location of the electronic device is taken as the origin. According to an embodiment, the processor may generate a fourth coordinate system in a state where the first external device (e.g., HMD device) on the generated third coordinate system is taken as the origin. For example, the processor may generate the fourth coordinate system based on the third coordinate system in the same or similar manner that the second coordinate system is generated based on the first coordinate system.

According to various embodiments, the processor of the electronic device may compare the movement range of the external device with the camera photographing range (840). For example, the processor may identify the data about the photographing range of the camera of the electronic device. Here, the photographing range of the camera may refer, for example, to the viewing angle of the camera. The processor may identify the camera photographing range corresponding to the camera viewing angle, and may determine whether the location of the external device (e.g., HMD device or controller device) gets out of the camera photographing range. According to an embodiment, the processor may be configured to calculate the coordinates of pixels on the boundary corresponding to the camera viewing angle on the third coordinate system and the fourth coordinate system. For example, the processor may calculate the coordinates of the pixels on the boundary of the viewing angle on the third coordinate system and the fourth coordinate system by identifying the data about the camera viewing angle. Here, the boundary of the viewing angle may refer, for example, to a threshold value for the camera photographing range. According to an embodiment, the processor may calculate the coordinates of the pixels on the third coordinate system and the fourth coordinate system corresponding to the points which get out of the camera photographing range. For example, the processor may be configured to calculate the location of the pixel on the third coordinate system and the fourth coordinate system as the coordinates, in which external devices can disappear from the viewing angle of the camera.

Referring to FIG. 8, the processor of the electronic device may track the movement of the external device through the camera, and may determine whether the movement is within the range in which the tracking through the camera is possible. For example, the processor may track the movement of the external device on the fourth coordinate system through the camera. The processor may determine the location while photographing the external device through the camera, and if the location of the external device gets out of the viewing angle, further tracking may not be performed. According to an embodiment, the processor may be configured to perform the tracking using the camera until the movement range of the external device (e.g., coordinate of the external device) gets out of the photographing range of the camera of the electronic device. For example, the processor may be configured to use the tracking method using the camera only in case that the location of the external device is within the viewing angle of the camera. The coordinates of the boundary pixels for the viewing angle of the camera on the third coordinate system and/or the fourth coordinate system may correspond to the threshold value for the range in which the external device can be tracked through the camera. According to various embodiments, since the processor of the electronic device can use the image photographed by the camera of the electronic device and/or the camera of the external device (e.g., first external device) when determining the location of the external device, the movement tracking using the camera may not be performed any more in a specific surrounding environment. For example, if the illumination gets out of a specified range (e.g., very high illumination or very low illumination), the recognition rate of the camera may be degraded. As another example, the recognition rate may be degraded due to interference of an IR area in an outdoor environment. According to an embodiment, the processor may be configured to perform the tracking using the camera until the surrounding environment (e.g., illumination) gets out of the range in which the recognition using the camera is possible. For example, the processor may be configured to use the tracking method using the camera only in case that the surrounding environment is within a specified range. Further, if the second external device is not included in the photographing range (viewing angle) of the camera of the first external device or if it is predicted that the second external device is not included in the photographing range, an input signal can be received in another method that is not the camera (e.g., using the UWB communication module).

According to various embodiments, the processor of the electronic device may be configured to implement the 6 degrees of freedom (6DoF) by tracking the movement (e.g., movement trajectory) of the first external device and the second external device in the predetermined period (e.g., real time). For example, the 6DoF may be used to track the translational motion of x, y, and z axes of the second external device and/or the rotational motion of the respective axes based on the first external device. According to an embodiment, the processor of the electronic device may calculate the first data and the second data of the second external device. The first data may include the posture information of the second external device on the fourth coordinate system. The second data may include the location information of the second external device on the fourth coordinate system. According to an embodiment, the first data and the second data of the second external device may be used for the 6DoF implementation. For example, in case that the motion of the second external device comes down from top while drawing a spiral, the 6DoF of the second external device can be implemented through the first data and the second data.

Referring to FIG. 8, if the location of the external device is changed in the photographing range of the camera on the third coordinate system and/or the fourth coordinate system, the processor of the electronic device may be configured to maintain the tracking of the movement of the external device through the camera (850).

Referring to FIG. 8, if the location of the external device gets out of the camera photographing range on the third coordinate system and/or the fourth coordinate system, the processor of the electronic device may be configured to track the movement of the external device in a method using the UWB service (860). For example, the processor may track the movement of the second external device in a method that is equal or similar to the movement tracking method of the second external device on the second coordinate system. According to various embodiments, if the tracking of the location of the external device using the cameras of the electronic device and/or the external device (e.g., first external device) is not possible due to the surrounding environment (e.g., illumination), the processor of the electronic device may be configured to track the movement of the external device in the method using the UWB service. According to an embodiment, the methods for tracking the movement of the external device using the camera or the antenna may be simultaneously used. According to an embodiment, in tracking the movement of the external device, the processor of the electronic device may perform the tracking in consideration of the method having low power consumption as the first utilization ranking. For example, the method using the UWB communication module may have large power consumption as compared with the method using the camera. The processor may basically execute the movement tracking using the camera having relatively low power consumption in the viewing angle, and may perform the tracking through the method using the UWB communication module outside the viewing angle.

Figure 9:
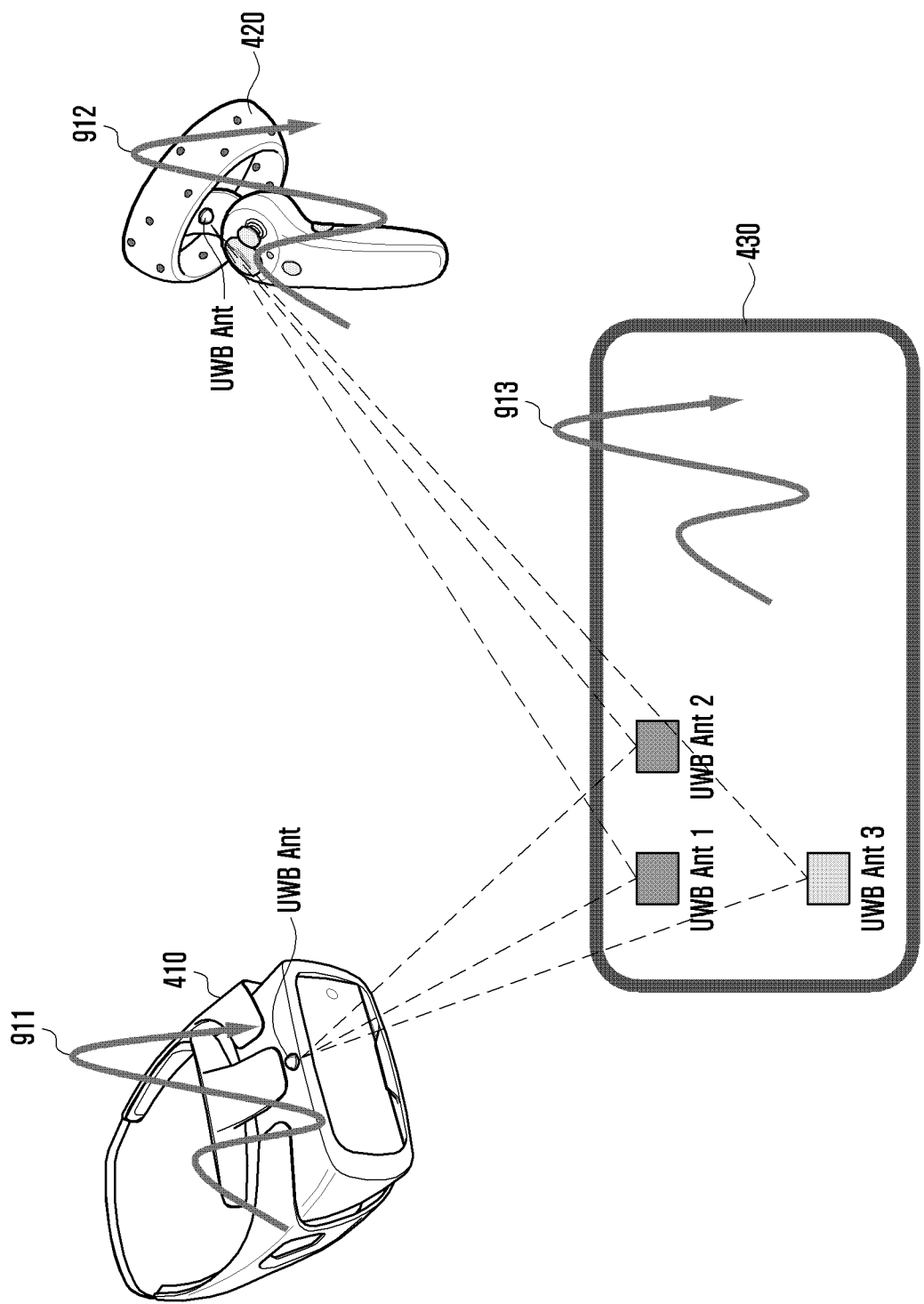
FIG. 9 is a diagram illustrating an electronic device tracking a location of an external device according to various embodiments.

FIG. 9 is a diagram illustrating an example of an electronic device tracking a location of an external device in various environments.

According to various embodiments, a situation in which the HMD device and the controller device are shaking may be assumed. For example, there may be a case that VR content is used in an airplane. In case of an environment in which content of the virtual space is executed only through connection between the HMD device and the controller device, the movement of the controller device can be tracked using the camera of the HMD device. In case of an environment in which shaking exists as in the airplane, the HMD device and the controller device are shaking together, and it may be difficult to track the movement of the controller device. The reason why the movement tracking is difficult due to the shaking is that the distance between the HMD device and the controller device may be irregularly changed.

Referring to FIG. 9, the coordinates of the first external device 410 and the second external device 420 may be calculated using the UWB communication module of the electronic device 430. For example, the processor of the electronic device may calculate the relative coordinate of the second external device, being generated based on the first external device. According to an embodiment, the electronic device 430, the first external device 410, and the second external device 420 may be exposed to an environment in which shaking exists. For example, the electronic device may shake along the trajectory of 913 of FIG. 9, the first external device may shake along the trajectory of 911 of FIG. 9, and the second external device may shake along the trajectory of 912 of FIG. 9. Since the tracking of the movement of the external device using the UWB communication module of the electronic device is performed through the coordinates of the first external device and the second external device, it may not be affected by the shaking of 911, 912, and 913. Here, the reason why being not affected is that the movement is tracked through the relative coordinates of the second external device on the second coordinate system.

An electronic device according to an example embodiment may include: an ultra-wide band (UWB) communication module including a plurality of antennas; and a processor operatively connected to the UWB communication module, wherein the processor is configured to: measure a first coordinate of a first external device and a second coordinate of a second external device generated based on signals received from the first external device and the second external device using the plurality of antennas, generate a first coordinate system based on the electronic device corresponding to the measured first coordinate and second coordinate, and regenerate a second coordinate system through reconfiguration of the first coordinate system based on the first external device.

The electronic device may further include a short-range communication module including communication circuitry, wherein the processor may be configured to transmit data about the regenerated second coordinate system to the first external device through the short-range communication module.

The plurality of antennas may include a first antenna, a second antenna, and a third antenna, wherein the processor may be configured to transmit signals for measuring the first coordinate and the second coordinate to the first external device and the second external device using the plurality of antennas.

The processor may be configured to calculate first data and second data of the second external device based on the regenerated second coordinate system.

The first data of the second external device may include posture information of the second external device on the second coordinate system, and the second data of the second external device may include location information of the second external device on the second coordinate system.

The processor may be configured to: calculate changes of values of the first data and the second data corresponding to movement of the first external device and the second external device, and track the movement of the first external device and the second external device on the second coordinate system based on the result of the calculation.

The processor may use at least one of a one way ranging (OWR) method, a two way ranging (TWR) method, or a time difference of arrival (TDoA) method when measuring the first coordinate and the second coordinate.

The electronic device may further include a camera, wherein the processor may be configured to: determine a location of the first external device and a location of the second external device using the camera, generate a third coordinate system by calculating coordinates of the first external device and the second external device based on the electronic device, and regenerate a fourth coordinate system through reconfiguration of the third coordinate system based on the first external device.

The processor may be configured to: calculate, based on the fourth coordinate system regenerated using the camera, the first data and the second data of the second external device based on the first external device, and track the movement of the first external device and the second external device on the fourth coordinate system based on the calculated values.

The processor may be configured to: track the movement of the first external device and the second external device on the fourth coordinate system based on a photographing range of the camera, and track the movement of the first external device and the second external device on the second coordinate system using the plurality of antennas in case that the camera escapes the photographing range of the camera.

A method for tracking movement of an external device using a plurality of antennas according to an example embodiment may include: measuring a first coordinate of a first external device and a second coordinate of a second external device generated based on signals received from the first external device and the second external device using the plurality of antennas; generating a first coordinate system based on the electronic device corresponding to the measured first coordinate and second coordinate; and regenerating a second coordinate system through reconfiguration of the first coordinate system based on the first external device.

The method may include transmitting data about the regenerated second coordinate system to the first external device through a short-range communication module.

The method may include transmitting signals for measuring the first coordinate and the second coordinate to the first external device and the second external device using the plurality of antennas including a first antenna, a second antenna, and a third antenna.

The method may further include calculating first data and second data of the second external device based on the regenerated second coordinate system.

The first data of the second external device may include posture information of the second external device on the second coordinate system, and the second data of the second external device may include location information of the second external device on the second coordinate system.

The calculating may include calculating changes of values of the first data and the second data in correspondence to movement of the first external device and the second external device, and may further include tracking the movement of the first external device and the second external device on the second coordinate system based on the result of the calculation.

The measuring may include measuring the first coordinate and the second coordinate using at least one of a one way ranging (OWR) method, a two way ranging (TWR) method, or a time difference of arrival (TDoA) method.

The method may further include: determining a location of the first external device and a location of the second external device using the camera; generating a third coordinate system by calculating coordinates of the first external device and the second external device based on the electronic device; and regenerating a fourth coordinate system through reconfiguration of the third coordinate system based on the first external device.

The method may further include: calculating, based on the fourth coordinate system, the first data and the second data of the second external device based on the first external device; and tracking the movement of the first external device and the second external device on the fourth coordinate system based on the calculated values.

The tracking may include: tracking the movement of the first external device and the second external device on the fourth coordinate system based on a photographing range of the camera; and tracking the movement of the first external device and the second external device on the second coordinate system using the plurality of antennas in case that the camera escapes the photographing range of the camera.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents.

What is claimed is:

1. An electronic device comprising:
    an ultra-wide band (UWB) communication module including a plurality of antennas; and
    a processor operatively connected to the UWB communication module,
    wherein the processor is configured to:
    measure a first coordinate of a head-mounted display (HMD) device in a first coordinate system generated where a location of the electronic device is an origin point of the first coordinate system based on UWB signals received from the HMD device using at least part of the plurality of antennas,
    measure a second coordinate of a handheld controller device in the first coordinate system using the location of the electronic device as the origin point based on UWB signals received from the handheld controller device using at least part of the plurality of antennas, and
    generate a second coordinate system by reconfiguring the first coordinate system including changing the first coordinate of the HMD device to an origin point of the second coordinate system, and calculate a coordinate of the handheld controller device in the second coordinate system using the first coordinate of the HMD device and the second coordinate of the handheld controller device.

2. The electronic device of claim 1, further comprising a short-range communication module comprising communication circuitry,
wherein the processor is configured to transmit data about the generated second coordinate system to the HMD device through the short-range communication module.

3. The electronic device of claim 1, wherein the plurality of antennas comprise a first antenna, a second antenna, and a third antenna,
wherein the processor is configured to transmit UWB signals for measuring the first coordinate and the second coordinate to the HMD device and the handheld controller device using the plurality of antennas.

4. The electronic device of claim 1, wherein the processor is configured to calculate first data and second data of the handheld controller device based on the generated second coordinate system.

5. The electronic device of claim 4, wherein the first data of the handheld controller device includes posture information of the handheld controller device on the second coordinate system, and
the second data of the handheld controller device includes location information of the handheld controller device on the second coordinate system.

6. The electronic device of claim 4, wherein the processor is configured to:
calculate changes of values of the first data and the second data corresponding to movement of the HMD device and the handheld controller device, and
track the movement of the HMD device and the handheld controller device on the second coordinate system based on the result of the calculation.

7. The electronic device of claim 1, wherein the processor uses at least one of a one way ranging (OWR) method, a two way ranging (TWR) method, or a time difference of arrival (TDoA) method when measuring the first coordinate and the second coordinate.

8. The electronic device of claim 4, further comprising a camera,
wherein the processor is configured to:
determine a location of the HMD device and a location of the handheld controller device using the camera,
generate a third coordinate system by calculating coordinates of the HMD device and the handheld controller device based on the electronic device, and
regenerate a fourth coordinate system through reconfiguration of the third coordinate system based on the HMD device.

9. The electronic device of claim 8, wherein the processor is configured to:
calculate, based on the fourth coordinate system regenerated using the camera, the first data and the second data of the handheld controller device based on the HMD device, and
track the movement of the HMD device and the handheld controller device on the fourth coordinate system based on the calculated values.

10. The electronic device of claim 9, wherein the processor is configured to:
track the movement of the HMD device and the handheld controller device on the fourth coordinate system based on a photographing range of the camera, and
track the movement of the HMD device and the handheld controller device on the second coordinate system using the plurality of antennas based on the camera escaping the photographing range of the camera.

11. A method for tracking movement of an external device using a plurality of antennas, the method comprising:
measuring a first coordinate of a head-mounted display (HMD) device in a first coordinate system generated where a location of the electronic device is an origin point of the first coordinate system based on UWB signals received from the HMD device using at least part of the plurality of antennas;
measuring a second coordinate of a handheld controller device in the first coordinate system using the location of the electronic device as the origin point based on UWB signals received from the handheld controller device using at least part of the plurality of antennas;
generating a second coordinate system by reconfiguring the first coordinate system including changing the first coordinate of the HMD device to an origin point of the second coordinate system; and
calculating a coordinate of the handheld controller device in the second coordinate system using the first coordinate of the HMD device and the second coordinate of the handheld controller device.

12. The method of claim 11, comprising transmitting data about the generated second coordinate system to the HMD device through a short-range communication module.

13. The method of claim 11, comprising transmitting UWB signals for measuring the first coordinate and the second coordinate to the HMD device and the handheld controller device using the plurality of antennas including a first antenna, a second antenna, and a third antenna.

14. The method of claim 11, further comprising calculating first data and second data of the handheld controller device based on the regenerated second coordinate system.

15. The method of claim 14, wherein the first data of the handheld controller device includes posture information of the handheld controller device on the second coordinate system, and
the second data of the handheld controller device includes location information of the handheld controller device on the second coordinate system.

16. The method of claim 14, wherein calculating comprises calculating changes of values of the first data and the second data corresponding to movement of the HMD device and the handheld controller device, and
calculating further includes tracking the movement of the HMD device and the handheld controller device on the second coordinate system based on the result of the calculation.

17. The method of claim 11, wherein measuring comprises measuring the first coordinate and the second coordinate using at least one of a one way ranging (OWR) method, a two way ranging (TWR) method, or a time difference of arrival (TDoA) method.

18. The method of claim 14, further comprising:
determining a location of the HMD device and a location of the handheld controller device using the camera;
generating a third coordinate system by calculating coordinates of the HMD device and the handheld controller device based on the electronic device; and
regenerating a fourth coordinate system through reconfiguration of the third coordinate system based on the HMD device.

19. The method of claim 18, further comprising:
calculating, based on the fourth coordinate system, the first data and the second data of the handheld controller device based on the HMD device; and
tracking the movement of the HMD device and the handheld controller device on the fourth coordinate system based on the calculated values.

20. The method of claim 19, wherein tracking comprises:
tracking the movement of the HMD device and the handheld controller device on the fourth coordinate system based on a photographing range of the camera; and
tracking the movement of the HMD device and the handheld controller device on the second coordinate system using the plurality of antennas based on the camera escaping the photographing range of the camera.

* * * * *